United States Patent Office 3,639,462

Patented Feb. 1, 1972

1

3,639,462

13,14-SECO-1,2,3,4-TETRAHYDRO-PHENANTHRENES

William McCrae, Los Altos, John H. Fried, Palo Alto, and John A. Edwards, Los Altos, Calif., assignors to Syntex Corporation, Panama, Panama No Drawing. Filed Mar. 18, 1968, Ser. No. 714,007
Int. Cl. C07c *61/28, 61/32*
U.S. Cl. 260—488 B 12 Claims

ABSTRACT OF THE DISCLOSURE

New 13,14-seco-13,14-oxido-, 13,14-seco-13,14-methylene-, 13,14-seco-13,14-dichloromethylene- and 13,14-seco-13,14-difluoromethylene - 1,2,3,4-tetrahydrophenanthrene-2-carboxylic acids and derivatives thereof having estrogenic activity.

This invention relates to 13,14-seco-1,2,3,4-tetrahydrophenanthrene-2-carboxylic acids and derivatives thereof. More particularly, the present invention relates to 13,14-seco - 1,2,3,4-tetrahydrophenanthrene-2-carboxylic acids and derivatives thereof of the following formula A:

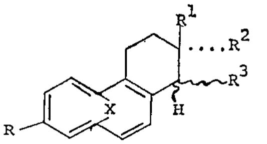

(A)

wherein

R is hydrogen, carboxylic acyloxy, lower alkoxy, cyclopentyloxy, cyclohexyloxy, tetrahydropyran-2′-yloxy or tetrahydrofuran-2′-yloxy;
$R^1$ is methyl or ethyl;
$R^2$ is formyl, $—CH_2OR^4$ or $—COOR^5$ in which $R^4$ is hydrogen, lower alkyl or carboxylic acyl and $R^5$ is hydrogen, lower alkyl, alkali metal or alkaline earth metal;
$R^3$ is methyl or ethyl; and
X is methylene, difluoromethylene, dichloromethylene or oxa.

The term "carboxylic acyloxy" and "carboxylic acyl," as used herein, refers to carboxylic acyloxy and acyl groups conventionally employed in the synthetic hormone art containing from 1 to 12 carbon atoms. Typical conventional esters thus included within the scope of the term and the instant invention are acetate, propionate, butyrate, valerate, caproate, enanthate, trifluoroacetate, benzoate, diphenylacetate, diethylacetate, trimethylacetate, and the like.

The term "lower alkyl" refers to straight and branched saturated aliphatic groups containing from one to about six carbon atoms such as methyl, ethyl, isopropyl, and the like. The term "lower alkoxy" refers to straight and branched chain alkoxy groups containing from one to about six carbon atoms such as methoxy, ethoxy, propionoxy, and the like. The wavy lines (∫) at the 1-position of the phenanthrene nucleus indicates alpha or beta configuration, i.e. the dl-cis and dl-trans isomers of the above formula.

The compounds of the present invention of Formula A possess estrogenic and anti-fertility activity and are useful in the treatment of estrogen deficiencies and in the control and regulation of fertility. By reason of their anti-fertility activity, they are useful for the control of pests, for example, rodents such as rats, mice, nutria, rabbits and the like. For this purpose, the compounds are

2 admixed with a suitable bait such as grain, salmon, and the like, and placed in an area accessible to the rodents. The amount of anti-fertility agent incorporated into the bait is not critical so long as it does not exceed the limit above which the rodent can detect the presence of the agent. The anti-fertility agent/bait mixture is preferably made available to the pest on, for example, alternate days in an amount which, by past experience, can be expected to be entirely consumed in two days.

Edible carriers suitable as a bait include liquids, solids and mixtures thereof such as water, milk molasses, corn oil, peanut oil, cottonseed oil, sugar, peanut butter, chicken mash, dairy mixes, corn, oats, wheat, bran, meat, fish, lard, chopped grass or hay, cheese, salt, and the like. In addition, conventional pest attractants and other additives normally employed in baits can be added. The compositions of the antifertility agent and bait can be prepared, for example, as a granular mix, as a paste, as a syrup, in the form of pellets for ease of application, and the like. Other forms of carriers can also be used such as forming a solution, e.g. a salt solution, or mixture containing a small amount of the anti-fertility agent, and impregnating a suitable carrier such as cellulosic materials, e.g. wood, with the solution.

The novel 13,14-seco compounds of the present invention wherein R is hydrogen, that is, the 7-desoxy-13,14-seco compounds, can be prepared according to the following outlined procedure wherein each of $R^1$ and $R^3$ is methyl or ethyl and $R^{2'}$ is the group $—CH_2OH$ or $—COOH$:

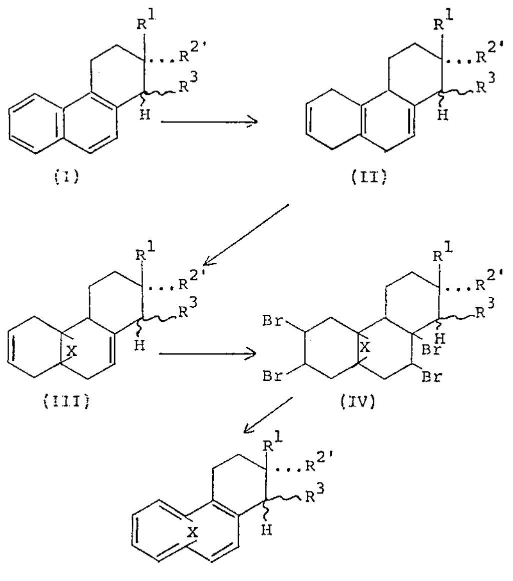

In practicing the process outlined above, a 7-desoxy-1,2,3,4 - tetrahydrophenanthrene (I) is reduced to the 7-desoxy - 1,2,3,4,5,8,9,12 - octahydrophenanthrene (II) by treatment with an alkali metal such as sodium, potassium or lithium in liquid ammonia in the presence of a lower alcohol such as ethanol, t-butanol, and the like.

A compound of Formula II is then converted into a 7-desoxy - 1,2,3,4,5,8,9,12,13,14 - decahydrophenanthrene (III) wherein X is methylene, dichloromethylene, difluoromethylene or oxa. A compound of Formula III wherein X is oxa can be obtained by treating a 7-desoxy-1,2,3,4,5,8,9,12 - octahydrophenanthrene (II) with a peracid such as perbenzoic acid, perphthalic acid, m-chloroperbenzoic acid, and the like, preferably m-chloroperbenzoic acid, in an organic solvent inert to the reaction such as methylene chloride, carbon tetrachloride, hexane, and the like.

A compound of Formula III wherein X is dichloromethylene or difluoromethylene can be obtained by reacting a compound of Formula II with a dihalocarbene generated from sodium trichloroacetate and sodium chlorodifluoroacetate, respectively. This reaction can be carried out in an organic solvent such as diglyme or monoglyme at elevated temperatures such as reflux.

The 5,10 - methylene compounds of Formula III (X is methylene) can be prepared by treating a 5,10-dichloromethylene with sodium or lithium in liquid ammonia in the presence of a lower alcohol.

A compound of Formula III is then converted into a 6,7,10,11 - tetrabromo - 1,2,3,4,5,6,7,8,9,10,11,12,13,14-tetradecahydrophenanthrene (IV) by treatment with bromine in an inert organic solvent such as chloroform, carbon tetrachloride, and the like. The tetrabromo compound (IV) upon treatment with a base such as an alkali metal hydroxide, alkali alkoxide, and the like, e.g. sodium hydroxide, sodium methoxide, potassium t-butoxide, or sodium t-butoxide, in an organic solvent such as ether, diglyme, dioxane, hexamethylphosphoramide, dimethyl sulfoxide, tetrahydrofuran, and the like, is converted into the 5,10-seco compounds of Formula V. This treatment with base in the case of phenanthrene-2-carboxylic acids of Formula IV will result in the formation of an acid salt of Formula V. If desired, the acid salt can be converted into the free acid (V) by mild treatment with acid.

The compounds of the present invention of Formula A wherein R is other than hydrogen can be prepared according to the following outlined procedure:

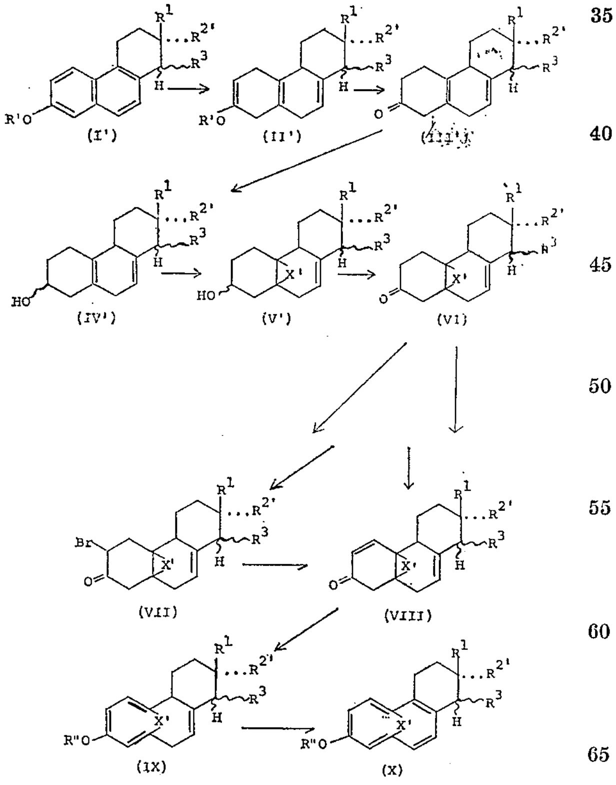

In the above formulas, R′ is lower alkyl, R″ is lower alkyl, cyclophentyl, cyclohexyl, a carboxylic acyl group, tetrahydropyran-2′-yl or tetrahydrofuran-2′-yl and X′ is methylene, dichloromethylene or difluoromethylene and $R^1$, $R^{2\prime}$ and $R^3$ are the same as defined above.

In the practice of the above outlined process, a 7-lower alkoxy-1,2,3,4 - tetrahydrophenanthrene (I′) is reduced using an alkali metal and liquid ammonia to afford a 7-lower alkoxy-1, 2,3,4,5,8,9,12 - octahydrophenanthrene (II′) which is treated with weak acid such as oxalic acid, dilute acetic acid, and the like to afford a 7-oxo-1,2,3,4,5,6,7,8,9,12-decahydrophenanthrene (III′). A compound of Formula III′ is then reduced as by treatment with sodium borohydride, lithium aluminum tri-(t-butoxide), and the like, to a 7-hydroxy-1,2,3,4,5,6,7,8,9,12-decahydrophenanthrene (IV′) which is converted into the corresponding 13,14-defluoromethylene ,13,14-dichloromethylent or 13,14-methylene derivative (V′) using the procedures described hereinabove. A 7-hydroxy compound of Formula V′ is then oxidized as by treatment with chromium trioxide in pyridine, Jones reagent, or the like, to obtain a 7-oxo compound of Formula VI. In this reaction, if $R^{2\prime}$ is hydroxymethyl at position 1, it is converted into the aldehyde group (i.e. $R^{2\prime}$ is formyl) during the course of the reaction. A 7-oxo compound of Formula VI is then converted into the corresponding 5,6-dehydro derivative (VIII) by treatment with selenium dioxide, 2,3-dichloro-5,6-dicyano-1,4-benzoquinone, or the like. Alternatively, a 7-oxo of Formula VI is treated with cupric bromide to afford a 6-bromo compound (VII) which is then dehydrobrominated by treatment with an alkali halide and alkali metal carbonate or bicarbonate or alkaline earth salt such as lithium bromide and sodium bicarbonate, lithium chloride and sodium carbonate, lithium bromide and calcium carbonate, and the like, to furnish the 5,6-dehydro derivative (VIII). Treatment of a 7-oxo compound of Formula VIII with a carboxylic acid anhydride, e.g. acetic anhydride, propionic anhydride, butyric anhyride, benzoic anhydride, trichloroacetic anhydride, in the presence of an acid catalyst such as p-toluenesulfonic acid, and the like, affords a 13,14 - seco - 7-acyloxy compound of Formula IX (IX; R″ is acyl). Alternatively, a 7-oxo compound of Formula VIII is reacted with a lower alcohol or cycloalkyl alcohol such as methanol, ethanol, pentanol, cyclopentanol, or cyclohexanol in the presence of an acid catalyst such as p-toluenesulfonic acid to afford a 13,14-seco-7-alkyloxy or 13,14-seco-7-cycloalkyloxy of Formula IX. A 13,14-seco compound of Formula IX is then treated with palladium catalyst, 2,3-dichloro - 5,6 - dicyano - 1,4 - benzoquinone or N-bromosuccinimide to obtain a 13,14-seco-1,2,3,4-tetrahydrophenanthrene of Formula X.

In the case of a compound of Formula A wherein X is oxa and R is other than hydrogen, the following outlined procedure can be used wherein $R^{2\prime\prime}$ is is —COOH or —CHO and R″, $R^1$ and $R^3$ are as defined above:

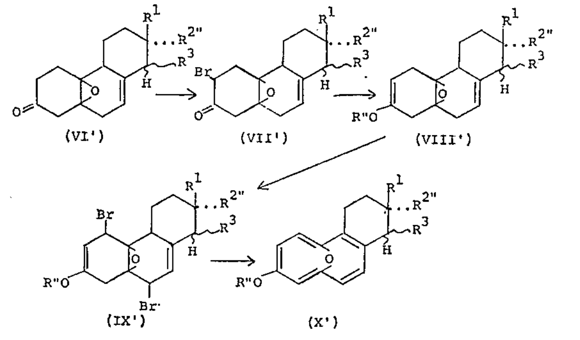

In the practice of this procedure, the 7-keto compound of Formula VI′ is converted into the 6-bromo derivative (VII′) by treatment with cupric bromide. A 13,14-oxido compound of Formula VI′ is obtained by treating a compound of Formula IV′ with a peracid followed by oxidation as by treatment with chromium trioxide in pyrimidine, or the like. A 6-bromo derivative (VII′) is treated with zinc at about 50° C. to 60° C. to form the zinc enolate thereof which is then treated with a carboxylic acid anhydride to obtain 13,14-oxido of Formula VIII′ wherein R″ is a carboxylic acyl group. To obtain compounds of Formula VIII′ wherein R″ is lower alkyl or cycloalkyl, the zinc enolate is treated with the corresponding dialkyl sulfate or dicycloalkyl sulfate. Compounds of Formula VIII' wherein R'' is tetrahydropyranyl or tetrahydrofuranyl are obtained by treating the zinc enolate with tetrahydropyranyl halide or tetrahydrofuranyl halide. A compound of Formula VIII' is then brominated using N-bromosuccinimide, or the like, to the 5,9-dibromo derivative (IX') which is dehydrobrominated by treatment with pyridine or other weak base to obtain the 13,14-seco-13,14-oxido (X').

The compounds of the present invention of Formula A wherein $R^2$ is the group —$COOR^5$ in which $R^5$ is lower alkyl, i.e. the acid esters, can be prepared from the corresponding acid ($R^2$ is —COOH) by treatment with a diazo-alkane such as diazo-methane, diazo-ethane, and the like, or by treating the corresponding alkali metal acid salt with a lower alkyl halide such as methyl bromide, methyl iodide, and the like, in an organic solvent such as dimethylacetamide, dimethylformamide, and the like.

Compounds of the present invention of Formula A wherein $R^2$ is hydroxymethyl can be obtained by treating an acid ester ($R^2$ is —$COOR^5$ in which $R^5$ is lower alkyl) with, for example, lithium aluminum t-butoxide, in an inert solvent such as tetrahydrofuran. The hydroxymethyl derivative can then be converted into the corresponding 2-formyl compounds by treatment with, for example, chromium trioxide in pyridine, and the like. The 2-formyl compounds (A; $R^2$ is —CHO) can also be obtained by converting the acid (A; $R^2$ is —COOH) into the acid chloride as by treatment with oxalyl chloride and the treating the acid chloride with hydrogen in the presence of palladium catalyst using the procedure of U.S. Pat. 2,494,253. The 2-formyl compound can be further subjected to reduction using palladium platinum, or the like, to afford 2-hydroxymethyl compounds (A; $R^2$ is —$CH_2OH$). The 2-hydroxymethyl compounds can be treated with a diazo-alkane such as diazo-methane, diazo-ethane, and the like, to obtain the corresponding 2-lower alkoxymethylene derivatives (A; $R^2$ is —$CH_2OR^4$ in which $R^4$ is lower alkyl) or with an esterification agent such as a carboxylic anhydride or halide to obtain the corresponding esters (A; $R^2$ is —$CH_2OR^4$ in which $R^4$ is carboxylic acyl).

The 2-formyl compounds of the present invention (A; $R^2$ is —CHO) can also be prepared from the 2-carboxylic acids of the present invention (A; $R^2$ is —COOH) by treatment with a carbodiimide using the procedure of H. A. Staab et al., Ann. Chem., 654,119, (1962).

Compounds suitable as starting materials for the preparation of the compounds of the present invention are available commercially or can be prepared by synthesis known in the art, see for example, U.S. Pats. 2,429,166; 2,259,834; 2,459,949; 2,459,950; 2,469,173; 2,493,773; and 2,494,253.

The following examples are provided to illustrate the practice of the present invention.

EXAMPLE 1

A solution of 10 g. of cis 7-desoxy-1,2-diethyl-1,2,3,4-tetrahydrophenanthrene - 2 - carboxylic acid in 100 ml. of ethanol: ether (1:1) is added to 15 g. of sodium in 500 ml. of liquid ammonia at —78°. After about one hour, the reaction mixture is allowed to rise to room temperature and then about 200 ml. of water followed by about 400 ml. of ether is added. The ether layer is separated, washed, dried over magnesium sulfate and evaporated to give cis 7-desoxy-1,2-diethyl-1,2,3,4,5,8,9,12 - octahydrophenanthrene - 2 - carboxylic acid (II; $R^1$ is $C_2H_5$, $R^{2'}$ is COOH $R^3$ is $C_2H_5$) which can be purified by chromatography.

By repeating the above procedure using as the starting material cis 1 - ethyl - 2 - methyl - 1,2,3,4-tetrahydrophenanthrene-2-carboxylic acid, cis 1-ethyl-2-methyl-2- hydroxy methyl-1,2,3,4-tetrahydrophenanthrene, cis 7 - methoxy-1-ethyl-2-methyl-1,2,3,4 - tetrahydrophenanthrene-2 - carboxylic acid, or cis 7 - methoxy - 1,2 - diethyl-2-hydroxymethyl - 1,2,3,4 - tetrahydrophenanthrene and the trans isomers thereof, there is obtained cis 1-ethyl-2 - methyl - 1,2,3,4,5,8,9,12 - octahydrophenanthrene-2-carboxylic acid, cis 1 - ethyl - 2 - methyl-2-hydroxymethyl-1,2,3,4,5,8,9,12 - octahydrophenanthrene, cis 7-methoxy-1 - ethyl - 2 - methyl - 1,2,3,4,5,8,9,12 - octahydrophenanthrene - 2 - carboxylic acid and cis 7 - methoxy - 1,2-diethyl - 2 - hydroxymethyl - 1,2,3,4,5,8,9,12-octahydrophenanthrene and the trans isomers thereof, respectively.

EXAMPLE 2

To a solution of 5 g. of cis 1,2-diethyl-1,2,3,4,5,8,9,12-octahydrophenanthrene - 2 - carboxylic acid in 100 ml. of diglyme heated to about 135°, there is added slowly a solution of 1.5 equivalents of sodium trichloroacetate in 100 ml. of diglyme over a period of about one hour. The reaction mixture is then allowed to cool to about room temperature and is then diluted with water and ethyl acetate. The ethyl acetate layer is separated, washed, dried over magnesium sulfate and evaporated to give cis 13,14 - dichloromethylene - 1,2 - diethyl - 1,2,3,4,5,8,9,12,13,14 - decahydrophenanthrene - 2 - carboxylic acid (III; $R^1$ is $C_2H_5$, $R^{2'}$ is COOH, $R^3$ is $C_2H_5$, X is $CCl_2$) which can be purified by chromatography.

By using sodium chlorodifluoroacetate in place of sodium trichloroacetate in the above procedure, there is obtained cis 13,14 - difluoromethylene - 1,2 - diethyl-1,2,3,4,5,8,9,12,13,14-decahydrophenanthrene - 2 - carboxylic acid.

EXAMPLE 3

A solution of 0.75 g. of cis 13,14 - dichloromethylene-1,2 - diethyl - 1,2,3,4,5,8,9,12,13,14 - decahydrophenanthrene - 2 - carboxylic acid in 50 ml. of ether is added to a solution of 175 mg. of sodium in 150 ml. of liquid ammonia with stirring. After two hours ammonium chloride is added until the blue color is discharged and the ammonia allowed to evaporate. Extraction with ether and recrystalliation from methanol affords cis 13, 14-methylene - 1,2 - diethyl - 1,2,3,4,5,8,9,12,13,14 - decahydrophenanthrene - 2 - carboxylic acid (III; $R^1$ is $C_2H_5$, $R^{2'}$ is COOH, $R^3$ is $C_2H_5$, X is $CH_2$).

EXAMPLE 4

To a solution of 1 g. of cis 13,14-methylene-1,2-diethyl - 1,2,3,4,5,8,9,12,13,14 - decahydrophenanthrene-2 - carboxylic acid in 100 ml. of carbon tetrachloride containing a trace of pyridine, there is added 2 equivalents of bromine in 50 ml. of carbon tetrachloride. The reaction mixture is allowed to stand at room temperature for 20 hours. The reaction mixture is washed, dried and evaporated to give cis 6,7,10,11 - tetrabromo - 13,14-methylene - 1,2 - diethyl - 1,2,3,4,5,6,7,8,9,10,11,12,13,14 - tetradecahydrophenanthrene - 2 - carboxylic acid (IV; $R^1$ is $C_2H_5$, $R^{2'}$ is COOH, $R^3$ is $C_2H_5$, X is $CH_2$).

One gram of the thus-obtained tetrabromo derivative is dissolved in 15 ml. of dry tetrahydrofuran and then about 2 g. of potassium t-butoxide is added. The reaction mixture is allowed to stand for about three hours and then it is diluted with water and ether and acidified to about pH 4. The ether layer is separated, washed, dried and evaporated to give cis 13,14 - seco - 13,14 - methylene-1,2 - diethyl - 1,2,3,4 - tetrahydrophenanthrene-2-carboxylic acid (V; $R^1$ is $C_2H_5$, $R^{2'}$ is COOH, $R^3$ is $C_2H_5$, X is $CH_2$).

By repeating the process of this example using cis 13, 14 - dichloromethylene - 1,2 - diethyl - 1,2,3,4,5,8,9,12, 13,14 - decahydrophenanthrene - 2 - carboxylic acid and cis 13,14 - difluoromethylene - 1,2 - diethyl-1,2,3,4,5,8, 9,12,13,14 - decahydrophenanthrene - 2 - carboxylic acid as the starting material, there is obtained cis 13,14-seco-13,14 - dichloromethylene - 1,2 - diethyl - 1,2,3,4-tetrahydrophenanthrene - 2 - carboxylic acid and cis 13,14-seco - 13,14 - difluoromethylene - 1,2 - diethyl-1,2,3,4-tetrahydrophenanthrene - 2 - carboxylic acid, respectively.

EXAMPLE 5

A solution of 20 g. of meta-chloroperbenzoic acid (75%) in 300 ml. of ethylene chloride is added slowly to 1 equivalent of cis 1,2-diethyl-1,2,3,4,5,8,9,12-octahydrophenanthrene - 2 - carboxylic acid in about 400 ml. of methylene chloride at —78° over a period of about one hour. After addition is complete, the reaction mixture is allowd to warm to room temperature. The reaction mixture is then washed with water, dried over magnesium sulfate and evaporated to give cis 13,14-oxido-1,2-diethyl-1,2,3,4,5,8,9,12,13,14 - decahydrophenanthrene - 2-carboxylic acid (III; $R^1$ is $C_2H_5$, $R^{2'}$ is COOH, $R^3$ is $C_2H_5$, X is O) which can be purified by chromatography.

EXAMPLE 6

To a solution of 5 g. of cis 13,14-oxido-1,2-diethyl-1,2,3,4,5,8,9,12,13,14 - decahydrophenanthrene - 2 - carboxylic acid in 100 ml. of chloroform, there is added dropwise 2 equivalents of bromine in 100 ml. of chloroform at a temperature of about 15–20°. The reaction mixture is allowed to stand at room temperature for about 0.1 hour and is then washed with water and evaporated to give cis 6,7,10,11-tetrabromo-13,14-oxido-1,2-diethyl-1,2,3,4,5,6,7,8,9,10,11,12,13,14 - tetradecahydrophenanthrene-2-carboxylic acid.

The above 6,7,10,11-tetrabromo derivative is treated with potassium t-butoxide as described in Example 4 to give cis 13,14 - seco - 13,14 - oxido-1,2-diethyl-1,2,3,4-tetrahydrophenanthrene-2-carboxylic acid of the following formula:

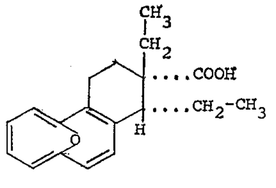

EXAMPLE 7

A solution of 1 g. of cis 13,14-dichloromethylene-1,2-diethyl-1,2,3,4,5,8,9,12,13,14 - decahydrophenanthrene - 2-carboxylic acid in dry tetrahydrofuran is refluxed for about 48 hours with a molar excess of lithium aluminum hydride. The reaction mixture is diluted with water and ethyl acetate. The ethyl acetate layer is separated, washed, dried and evaporated to give cis 13,14-methylene-1,2-diethyl-2-hydroxymethyl - 1,2,3,4,5,8,9,12,13,14 - decahydrophenanthrene.

EXAMPLE 8

A solution of 1 g. of cis 1,2-dimethyl-1,2,3,4-tetrahydrophenanthrene - 2 - carboxylic acid in 50 ml. of t-butyl alcohol:tetrahydrofuran (1:1) is added to 10 g. of lithium in 250 ml. of liquid ammonia. The mixture is allowed to stand for about four hours and the ammonia then allowed to evaporate. The residue is extracted with ether and these extracts are evaporated. The resulting residue is chromatographed on alumina to give cis 1,2-dimethyl-1,2,3,4,5,8,9,12 - octahydrophenanthrene - 2 - carboxylic acid.

By use of the above procedure, other 1,2,3,4 - tetrahydrophenanthrenes of Formulas I and I' can be converted into 1,2,3,4,5,8,9,12-octahydrophenanthrenes.

EXAMPLE 9

A mixture of 2 g. of cis 7 - methoxy - 2 - methyl - 1-ethyl - 1,2,3,4,5,8,9,12 - octahydrophenanthrene - 2 - carboxylic acid and 35 ml. of methanol is heated to reflux and 3.5 ml. of acetic acid added. This mixture is refluxed for about 15 minutes and then allowed to cool. The mixture is then diluted with water and filtered. The crude product is crystallized from methanol and then from a mixture of acetone and petroleum ether to give cis 7-oxo-2-methyl-1-ethyl - 1,2,3,4,5,6,7,8,9,12 - decahydrophenanthrene - 2-carboxylic acid of the following formula:

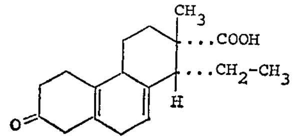

To a mixture of 2 g. of the thus-obtained 7-oxo compound and 30 ml. of methanol, there is added a mixture of 1 molar equivalent of sodium borohydride in 25 ml. of methanol. The reaction mixture is allowed to stand at room temperature for about three hours and then filtered. The filtrate is acidified to about pH 6 with weak aqueous acetic acid and then diluted with water and filtered. The crude product is crystallized from aqueous methanol and then from benzene:hexane to give cis 7-hydroxy-2-methyl - 1 - ethyl - 1,2,3,4,5,6,7,8,9,12 - decahydrophenanthrene - 2 - carboxylic acid which is used as the starting material in the procedure of Example 2 to yield cis 13,14-dichloromethylene - 7 - hydroxy - 2 - methyl - 1 - ethyl-1,2,3,4,5,6,7,8,9,12,13,14 - dodecahydrophenanthrene - 2-carboxylic acid (V'; $R^1$ is $CH_3$, $R^{2'}$ is COOH, $R^3$ is $C_2H_5$, X' is $CCl_2$).

EXAMPLE 10

A solution of 6 g. of the 13,14-dichloromethylene of Example 9 in 120 ml. of pyridine is added to a mixture of 6 g. of chromium trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield cis 13,14 - dichloromethylene - 7 - oxo - 2 - methyl - 1 - ethyl-1,2,3,4,5,6,7,8,9,12,13,14 - dodecahydrophenanthrene - 2-carboxylic acid.

A mixture of 0.5 g. of the thus-obtained cis 13,14-dichloromethylene - 7 - oxo compound, 10 ml. of dioxane and 0.35 g. of 2,3 - dichloro - 5,6 - dicyano - 1,4 - benzoquinone is refluxed for 10 hours. The mixture is then cooled, filtered and evaporated to dryness. The residue is dissolved in acetone and this solution is then filtered through 10 g. of alumina and concentrated to yield cis 13,14-dichloromethylene - 7 - oxo - 2 - methyl - 1 - ethyl - 1,2,3,4,7,8,9,12,13,14 - decahydrophenanthrene - 2 - carboxylic acid (VIII; $R^1$ is $CH_3$, $R^{2'}$ is COOH, $R^3$ is $C_2H_5$, X' is $CCl_2$).

EXAMPLE 11

A mixture of 1 g. of cis 13,14-dichloromethylene-7-oxo-2 - methyl - 1 - ethyl - 1,2,3,4,7,8,9,12,13,14 - decahydrophenanthrene - 2 - carboxylic acid, 20 ml. of acetic anhydride and 100 mg. of p-toluenesulfonic acid is refluxed for one hour. The reaction mixture is then poured into sodium carbonate solution to hydrolyze any excess anhydride. This mixture is extracted with methylene chloride. The methylene chloride extracts are washed, dried and evaporated to give cis 7-acetoxy-13,14-seco-13,14-dichloromethylene - 2 - methyl - 1 - ethyl - 1,2,3,9,12 - hexahydrophenanthrene - 2 - carboxylic acid (IX; $R^1$ is $CH_3$, $R_2'$ is COOH, $R^3$ is $C_2H_5$, X' is $CCl_2$, R'' is acetoxy).

A mixture of 0.5 g. of the above compound, 10 ml. of dioxane and 0.35 g. of 2,3-dichloro-5,6-dicyano-1,4-benzoquinone is refluxed for 10 hours. The mixture is then cooled, filtered and evaporated to dryness. The residue is dissolved in acetone and this solution is then filtered through 10 g. of alumina and concentrated to yield cis 7 - acetoxy - 13,14 - seco - 13,14 - dichloromethylene - 2-methyl - 1 - ethyl - 1,2,3,4 - tetrahydrophenanthrene - 2-carboxylic acid which is further purified by chromatography.

EXAMPLE 12

A mixture of 3 g. of cis 13,14-dichloromethylene-7-oxo-2 - methyl - 1 - ethyl - 1,2,3,4,7,8,9,12,13,14 - decahydrophenanthrene - 2 - carboxylic acid, 250 ml. of methanol and 300 mg. of p-toluene-sulfonic acid is refluxed for about 30 minutes. The mixture is cooled, diluted with water and extracted with ether. The combined ether extracts are washed with water, dried and evaporated. The residue is crystallized from methanol to give cis 7-methoxy-13,14-seco - 13,14 - dichloromethylene - 2 - methyl - 1 - ethyl-1,2,3,4,9,12 - hexahydrophenanthrene - 2 - carboxylic acid (IX; $R^1$ is $CH_3$, $R^{2'}$ is COOH, $R^3$ is $C_2H_5$, X' is $CCl_2$, R'' is $OCH_3$) which is treated according to the procedure of the second paragraph of Example 11 to give the corresponding cis 7-methoxy-13,14-seco-13,14-dichloromethylene-2-methyl-1-ethyl-1,2,3,4 - tetrahydrophenanthrene-2-carboxylic acid (X; $R^1$ is $CH_3$, $R^{2'}$ is COOH, $R^3$ is $C_2H_5$, X' is $CCl_2$, R'' is $OCH_3$).

EXAMPLE 13

A mixture of 1.7 g. of cis 13,14-dichloromethylene-7-oxo - 2-methyl-1-ethyl-1,2,3,4,5,6,7,8,9,12,13,14-dodecahydrophenanthrene-2-carboxylic acid, 2.3 g. of cupric bromide and 200 ml. of methanol is refluxed for 24 hours. The reaction mixture is poured into water and the resulting mixture extracted with chloroform. The organic extracts are dried over magnesium sulfate and evaporated. The residue is chromatographed on silica gel eluting with ether: benzene to give cis 6-bromo-13,14-dichloromethylene-7-oxo - 2-methyl-1-ethyl-1,2,3,4,5,6,7,8,9,12,13,14-dodecahydrophenanthrene-2-carboxylic acid (VII; $R^1$ is $CH_3$, $R^{2'}$ is COOH, $R^3$ is $C_2H_5$, X' is $CCl_2$) which can be further purified by chromatography.

A mixture of 1 g. of the above 6-bromo compound, 1.2 g. of lithium carbonate, 1.2 g. of lithium bromide and 100 ml. of dimethylformamide is stirred at about 90° for 20 hours. The reaction mixture is poured into weakly acidic water and extracted with ether. The ether extracts are washed well with water, dried and evaporated. The residue is chromatographed on alumina to yield cis 13,14-dichloromethylene-7-oxo-2-methyl-1-ethyl-1,2,3,4,7,8,9,12,13,14-decahydrophenanthrene-2-carboxylic acid.

EXAMPLE 14

A solution of 20 g. of meta-chloroperbenzoic acid (75%) in 300 ml. of methylene chloride is added slowly to 1 equivalent of cis 7-hydroxy-2-methyl-1-ethyl-1,2,3,4,5,6,7,8,9,12 - decahydrophenanthrene - 2 - carboxylic acid in about 400 ml. of methylene chloride at —78° over a period of about one hour. After addition is complete, the reaction mixture is allowed to warm to room temperature. The reaction mixture is then washed with water and dried over magnesium sulfate and evaporated to give cis 13,14-oxido-7 - hydroxy-2-methyl-1-ethyl-1,2,3,4,5,6,7,8,9,12,13,14-dodecahydrophenanthrene-2-carboxylic acid which can be purified by chromatography. This compound is treated with chromium trioxide in pyridine using the procedure of Example 10 to give cis 13,14-oxido-7-oxo-2-methyl-1-ethyl - 1,2,3,4,5,6,7,8,9,12,13,14-dodecahydrophenanthrene-2-carboxylic acid (VI'; $R^1$ is $CH_3$, $R^{2''}$ is COOH, $R^3$ is $C_2H_5$).

EXAMPLE 15

By reacting cis 13,14-oxido-7-oxo-2-methyl-1-ethyl-1,2,3,4,5,6,7,8,9,12,13,14 - dodecthydrophenanthrene - 2 - carboxylic acid with cupric bromide according to the procedure of Example 13, there is obtained cis 6-bromo-13,14-oxido - 7 - oxo-2-methyl-1-ethyl-1,2,3,4,5,6,7,8,9,12,13,14-dodecahydrophenanthrene-2-carboxylic acid.

EXAMPLE 16

A mixture of 3 g. of cis 6-bromo-7-oxo-13,14-oxido-2-methyl - 1 - ethyl - 1,2,3,4,5,6,7,8,9,12,13,14-dodecahydrophenanthrene-2-carboxylic acid, about 2 equivalents of zinc powder and 200 ml. of dry tetrahydrofuran is stirred for about two hours at 50–60°. Stirring is continued until formation of zinc enolate is complete as checked by thin layer chromatography. The mixture is allowed to stand and cool and then decanted under anhydrous conditions. To the thus-obtained solution there is added about 50 ml. of acetic anhydride and the mixture stirred. The reaction mixture is then allowed to stand at room temperature until formation of the enol acetate is complete as checked by thin layer chromatography. The reaction mixture is then diluted with pyridine and poured into water. This mixture is extracted with methylene chloride. The methylene chloride extracts are washed, dried and evaporated to give cis 7-acetoxy-13,14 - oxido-2-methyl-1-ethyl-1,2,3,4,5,8,9,12,13,14-decahydrophenanthrene-2-carboxylic acid (VIII'; $R^1$ is $CH_3$, $R^{2''}$ is COOH, $R^3$ is $C_2H_5$, R'' is acetoxy).

By using other carboxylic acid anhydrides, e.g. propionic anhydride, butyric anhydride, trifluoroacetic anhydride, benzoic anhydride, and the like, in place of acetic anhydride in the above procedure, the corresponding 7-acyloxy derivatives are obtained.

By repeating the above procedure with the exception of using an equivalent amount of dimethyl sulfate, dicyclopentyl sulfate, tetrahydropyranyl chloride and tetrahydrofuranyl chloride in place of acetic anhydride, the corresponding enol ethers are obtained, that is, cis 7-methoxy-13,14-oxido-2-methyl-1-ethyl-1,2,3,4,5,8,9,12,13,14-decahydrophenanthrene-2-carboxylic acid,
cis 7-cyclopentyloxy-13,14-oxido-2-methyl-1-ethyl-1,2,3,4,5,8,9,12,13,14-decahydrophenanthrene-2-carboxylic acid,
cis 7-(tetrahydropyran-2'-yloxy)-13,14-oxido-2-methyl-1-ethyl-1,2,3,4,5,8,9,12,13,14-decahydrophenanthrene-2-carboxylic acid, and
cis 7-(tetrahydrofuran-2'-yloxy)-13,14-oxido-2-methyl-1-ethyl-1,2,3,4,5,8,9,12,13,14-decahydrophenanthrene-2-carboxylic acid, respectively.

Similarly, by repeating this example using cis 6-bromo-7 - oxo-13,14-methylene-2-methyl-1-ethyl-1,2,3,4,5,6,7,8,9,12,13,14 - dodecahydrophenanthrene-2-carboxylic acid as the starting material, the corresponding enol acylates and enol ethers are obtained, e.g.

cis 7-acetoxy-13,14-methylene-2-methyl-1-ethyl-1,2,3,4,5,8,9,12,13,14-decahydrophenanthrene-2-carboxylic acid,
cis 7-methoxy-13,14-methylene-2-methyl-1-ethyl-1,2,3,4,5,8,9,12,13,14-decahydrophenanthrene-2-carboxylic acid,
cis 7-cyclopentyloxy-13,14-methylene-2-methyl-1-ethyl-1,2,3,4,5,8,9,12,13,14-decahydrophenanthrene-2-carboxylic acid,
cis 7-(tetrahydropyran-2'-yloxy)-13,14-methylene-2-methyl-1-ethyl-1,2,3,4,5,8,9,12,13,14-decahydrophenanthrene-2-carboxylic acid, and
cis 7-(tetrahydrofuran-2'-yloxy)-13,14-methylene-2-methyl-1-ethyl-1,2,3,4,5,8,9,12,13,14-decahydrophenanthrene-2-carboxylic acid.

EXAMPLE 17

A mixture of 2 g. of cis 7-methoxy-13,14-oxido-2-methyl - 1-ethyl-1,2,3,4,5,8,9,12,13,14-decahydrophenanthrene-2-carboxylic acid and 2 equivalents of N-bromosuccinimide in 50 ml. of carbon tetrachloride is refluxed for about one hour. The mixture is then filtered and evaporated to dryness under reduced pressure to yield cis 7-methoxy-13,14 - oxido - 5,9-dibromo-2-methyl-1-ethyl-1,2,3,4,5,8,9,12,13,14 - decahydrophenanthrene-2-carboxylic acid (IX'; $R^1$ is $CH_3$, $R^{2''}$ is COOH, $R^3$ is $C_2H_5$, R'' is $OCH_3$) which can be purified by chromatography.

One gram of the thus-obtained 5,9-dibromo derivative, 10 ml. of dry pyridine and 20 ml. of dry tetrahydrofuran is refluxed under nitrogen for about three hours. The reaction mixture is then diluted with water and ether. The organic layer is separated, washed, dried and evaporated under reduced pressure to give cis 7-methoxy-13,14-seco-13,14-oxido - 2-methyl-1-ethyl-1,2,3,4-tetrahydrophenanthrene-2-carboxylic acid (X'; $R^1$ is $CH_3$, $R^{2''}$ is COOH, $R^3$ is $C_2H_5$, R'' is $OCH_3$) which can be further purified by chromatography.

The procedure of this example is repeated using cis 7 - acetoxy - 13,14-oxido-2-methyl-1-ethyl-1,2,3,4,5,8,9,12, 13,14 - decahydrophenanthrene - 2 - carboxylic acid as the starting material and there is obtained cis 7-acetoxy-13,14-seco - 13,14 - oxido-2-methyl-1-ethyl-1,2,3,4-tetrahydrophenanthrene-2-carboxylic acid.

Similarly, by using the other 1,2,3,4,5,8,9,12,13,14-decahydrophenanthrenes of Example 16 in the above procedure, the corresponding 13,14-seco-1,2,3,4-tetrahydrophenanthrenes are obtained.

EXAMPLE 18

A mixture of 2 g. of cis 13,14-methylene-7-oxo-2-methyl - 1 - ethyl - 1,2,3,4,7,8,9,12,13,14 - decahydrophenanthrene-2-carboxylic acid, about 2 equivalents of zinc powder and 100 ml. of dry tetrahydrofuran is stirred at 50–60° for about two hours. The mixture is then allowed to stand and cool and thereafter decanted. The thus-obtained solution is treated with an excess of tetrahydropyranyl chloride, stirred and allowed to stand at room temperature for several hours until the reaction is complete as checked by thin layer chromatography. The mixture is poured into dilute aqueous sodium carbonate solution, neutralized and then extracted with methylene chloride. The methylene chloride extracts are washed, dried and evaporated to give cis 7-(tetrahydropyran-2′-yloxyl)-13,14 - seco - 13,14 - methylene - 2 - methyl - 1 - ethyl - 1,2,3,4,9,12-hexahydrophenanthrene-2-carboxylic acid which can be further purified by chromatography.

By using tetrahydrofuranyl chloride or bromide in the above procedure in place of tetrahydropyranyl chloride, there is obtained cis 7-(tetrahydrofuran-2′-yloxy)-13,14-seco - 13,14 - methylene - 2 - methyl - 1 - ethyl - 1,2,3,4,9,12-hexahydrophenanthrene-2-carboxylic acid.

By repeating the above procedure with the exception of using cis 13,14-difluoromethylene-7-oxo-2-methyl-1-ethyl - 1,2,3,4,7,8,9,12,13,14 - decahydrophenathrene - 2-carboxylic acid or cis 13,14-dichloromethylene-7-oxo-2-methyl - 1 - ethyl - 1,2,3,4,7,8,9,12,13,14-decahydrophenanthrene-2-carboxylic acid as the starting material, there is obtained cis 7-(tetrahydropyran-2′-yloxy)-13,14-seco-13,14 - difluoromethylene - 2 - methyl - 1 - ethyl - 1,2,3,4,9,12-hexahydrophenanthrene-2-carboxylic acid and cis 7-(tetrahydrofuran - 2′ - yloxy) - 13,14 - seco - 13,14 - dichloromethylene - 2 - methyl - 1 - ethyl - 1,2,3,4,9,12-hexahydrophenanthrene-2-carboxylic acid.

EXAMPLE 19

To a solution of g. of cis 7-(tetrahydropyran-2′-yloxy)-13,14 - seco - 13,14 - methylene - 2 - methyl - 1 - ethyl - 1,2,3,4,9,12-hexahydrophenanthrene-2-carboxylic acid in 100 ml. of carbon tetrachloride, there is added about 1 equivalent of bromine in 50 ml. of carbon tetrachloride. The reaction mixture is allowed to stand at room temperature for about 1hour. The mixture is then washed, dried and evaporated to give cis 7-(tetrahydropyran-2′-yloxy)-10,11 - dibromo - 13,14 - seco - 13,14 - methylene - 2-methyl - 1 - ethyl - 1,2,3,4,9,10,11,12 - octahydrophenanthrene-2-carboxylic acid which is dehydrobrominated using dry pyridine in tetrahydrofuran refluxing under nitrogen for about three hours to yield cis 7-(tetrahydropyran-2′-yloxy) - 13,14 - seco-13,14 - methylene - 2 - methyl - 1-ethyl-1,2,3,4-tetrahydrophenanthrene-2-carboxylic acid.

By using the other 13,14-seco-1,2,3,4,9,12-hexahydrophenanthrene-2-carboxylic acids of Example 18 in the above procedure, the corresponding 13,14-seco-1,2,3,4-tetrahydrophenanthrene-2-carboxylic acids are obtained.

Alternatively, the 13,14-seco-1,2,3,4,9,12-hexahydrophenanthrenes can be treated with 2,3-dichloro-5,6-dicyano-1,4-benzoquinone or with palladium catalyst to give the corresponding 13,14-seco-1,2,3,4-tetrahydrophenanthrenes.

EXAMPLE 20

To a solution of 5 g. of cis 7-hydroxy-2-methyl-1-ethyl-1,2,3,4,5,6,7,8,9,12 - decahydrophenanthrene-2-carboxylic acid in 100 ml. of diglyme heated to about 135°, there is added slowly a solution of 1.5 equivalents of sodium chlorodifluoroacetate in 100 ml. of diglyme over a period of about one hour. The reaction mixture is then allowed to cool to about room temperature and is then diluted with water and ethyl acetate. The ethyl acetate layer is separated, washed, dried over magnesium sulfate and evaporated to give cis 13,14-difluoromethylene-7-hydroxy-2-methyl - 1 - ethyl - 1,2,3,4,5,6,7,8,9,12,13,14 - dodecahydrophenanthrene-2-carboxylic acid which is treated with chromium trioxide in pyridine by the procedure of Example 10 to give cis 13,14-difluoromethylene-7-oxo-2-methyl-1 - ethyl - 1,2,3,4,5,6,7,8,9,12,13,14 - dodecahydrophenanthrene-2-carboxylic acid (VI; $R^1$ is $CH_3$, $R^{2'}$ is COOH, $R^3$ is $C_2H_5$, X′ is $CF_2$).

The above procedure is repeated with the exception of using cis 7-hydroxy-2-methyl-1-ethyl-2-hydroxymethyl-1,2,3,4,5,6,7,8,9,12-decahydrophenanthrene as the starting material and there is obtained cis 13,14-difluoromethylene-7 - oxo - 2 - methyl - 1 -ethyl - 2 - formyl - 1,2,3,4,5,6,7,8,9,12,13,14-dodecahydrophenanthrene (VI′; $R^1$ is $CH_3$, $R^{2'}$ is CHO, $R^3$ is $C_2H_5$, X′ is $CF_2$).

The above 13,14-difluoromethylene compounds are subjected to the procedure of Example 10 (second paragraph) or 13 to furnish the 5,6-dehydro derivatives thereof.

By repeating this example using sodium trichloroacetate in place of sodium chlorodifluoroacetate, the corresponding 13,14-dichloromethylene derivatives are obtained.

EXAMPLE 21

The procedure of Example 11 is repeated using cis 13,14 - difluoromethylene - 7 - oxo - 2 - methyl - 1 - ethyl - 1,2,3,4,7,8,9,12,13,14 - decahydrophenanthrene - 2 - carboxlic acid as the starting material and there is obtained cis 7-acetoxy-13,14-seco-13,14-difluoromethylene-2-methyl-1-ethyl-1,2,3,4-tetrahydrophenanthrene - 2 - carboxylic acid.

Similarly, by using the other 13,14-dihalomethylene-1,2,3,4,7,8,9,12,13,14-decahydrophenanthrenes of Example 20 in the process of Example 11, the corresponding 7-acetoxy - 13,14 - seco - 13,14 - dihalomethylene - 1,2,3,4-tetrahydrophenanthrenes are obtained, e.g. cis 7-acetoxy-13,14 - seco - 13,14 - difluoromethylene - 2 - methyl - 1-ethyl-2-formyl-1,2,3,4-tetrahydrophenanthrene and cis 7-acetoxy - 13,14 - seco - 13,14 - dichloromethylene - 2-methyl - 1 - ethyl - 1,2,3,4 - tetrahydrophenanthrene - 2-carboxylic acid.
13,14 - seco - 13,14 - dichloromethylene - 2 - methyl - 1-ethyl-1,2,3,4-tetrahydrophenanthrene-2-carboxylic acid.

By repeating the procedure of Example 12 using the 13,14 - dihalomethylene - 1,2,3,4,7,8,9,12,13,14 - decahydrophenanthrenes of Example 20 as the starting material, the 7 - methoxy - 13,14 - seco - 13,14 - dihalomethylene - 1,2,3,4-tetrahydrophenanthrene derivatives are obtained, e.g. cis 7-methoxy-13,14-seco-13,14-difluoromethylene-2-methyl - 1 - ethyl - 1,2,3,4 - tetrahydrophenanthrene - 2 - carboxylic acid. By using other alcohols such as ethanol, cyclopentanol, cyclohexanol, and the like, in place of methanol in the procedure of Example 12, the corresponding 7-ethoxy, 7-cyclopentyloxy and 7-cyclohexyloxy derivatives are obtained.

EXAMPLE 22

The procedure of Example 7 is repeated using cis 13,14 - dichloromethylene-7-hydroxy-2-methyl-1-ethyl-2-hydroxymethyl-1,2,3,4,5,8,9,12,13,14 - decahydrophenanthrene as the starting material and there is obtained cis 13,14 - methylene-7-hydroxy-2-methyl-1-ethyl-2-hydroxymethyl - 1,2,3,4,5,8,9,12,13,14 - decahoydrophenanthrene which is oxidized using chromium trioxide in pyridine to cis 13,14-methylene-7-oxo-2-methyl-1-ethyl-2-formyl-1,2,3,4,5,8,9,12,13,14-decahydrophenanthrene which is then subjected to the processes of Examples 10 (second paragraph) and 11 to yield cis 7-acetoxy-13,14-seco-13,14- methylene-2-methyl-1-ethyl-2-formyl-1,2,3,4 - tetrahydrophenanthrene.

By subjecting cis 13,14-methylene-7-oxo-2-methyl-1-ethyl-2-formyl-1,2,3,4,5,8,9,12,13,14 - decahydrophenanthrene to the procedure of Example 12, there is obtained cis 7-methoxy-13,14-seco-13,14-methylene-2-methyl-1-ethyl-2-formyl-1,2,3,4-tetrahydrophenanthrene.

EXAMPLE 23

To a solution of 1 g. of cis 1-methoxy-13,14-seco-13,14-difluoromethylene - 2 - methyl-1-ethyl-1,2,3,4-tetrahydrophenanthrene-2-carboxylic acid in 25 ml. of benzene, there is added with stirring a molar equivalent of potassium bicarbonate. This mixture is stirred until the evolution of carbon dioxide ceases and then the mixture is evaporated to furnish the potassium salt of cis 7-methoxy-13,14-seco-13,14-difluoromethylene - 2 - methyl-1-ethyl-1,2,3,4-tetrahydrophenanthrene-2-carboxylic acid.

By using sodium bicarbonate in the above procedure, the corresponding sodium acid salt is obtained.

Alternatively, acid salts can be prepared by titrating a solution of the free acid with an alcohol solution of the appropriate alkali metal alkoxide to neutrality.

EXAMPLE 24

A solution of 2 g. of cis-7-methoxy-13,14-seco-13,14-methylene-2-methyl-1-ethyl-2-formyl - 1,2,3,4-tetrahydrophenanthrene in 20 ml. of dry tetrahydrofuran is cooled to —75° C. in a Dry Ice-acetone bath and treated with a previously cooled solution of 0.6 g. of lithium aluminum t-butoxide in 20 ml. of dry tetrahydrofuran. After maintaining the reaction mixture at —75° C. for about one hour and then at room temperature for about 30 minutes, it is poured into ice water and extracted several times with ethyl acetate. These extracts are washed with water to neutrality, dried and evaporated. The residue is chromatographed to yield cis 7-methoxy-13,14-seco-13,14-methylene-2-methyl-1 - ethyl-2-hydroxymethyl-1,2,3,4-tetrahydrophenanthrene.

Alternatively, the 2-formyl compounds can be hydrogenated in the presence of a platinum catalyst until 1 mole of hydrogen has been absorbed to obtain the 2-hydroxymethyl derivatives.

EXAMPLE 25

To a solution of 3 g. of cis 7-methoxy-13,14-seco-13,14 - methylene-2-methyl-1-ethyl-2-hydroxymethyl-1,2,3,4-tetrahydrophenanthrene in 50 ml. of methylene chloride is added an excess of diazomethane in ether and a few drops of methanol. The reaction mixture is maintained at room temperature for about 18 hours and the excess reagent is then decomposed by the addition of acetic acid. The resulting mixture is poured into water and the organic layer is separated, washed and evaporated to yield cis 7 - methoxy-13,14-seco-13,14-methylene-2-methyl-1-ethyl-2-methoxymethyl - 1,2,3,4 - tetrahydrophenanthrene.

EXAMPLE 26

A mixture of 300 mg. of the sodium salt of cis 7-methoxy-13,14-seco - 13,14 - difluoromethylene-1-ethyl-2-methyl-1,2,3,4-tetrahydrophenanthrene-2-carboxylic acid, 1 ml. of methyl iodide and 7 ml. of dimethylacetamide is stirred in the dark for five hours. Then, excess methyl iodide is removed by evaporation under reduced pressure. The reaction mixture is then poured into water and the mixture extracted several times with ether. The ether extracts are combined, washed, dried and evaporated to furnish the methyl ester of cis 7-methoxy-13,14-seco-13,14-difluoromethylene - 1 - ethyl-2-methyl-1,2,3,4-tetrahydrophenanthrene-2-carboxylic acid.

EXAMPLE 27

A mixture of 1 g. of the methyl ester of cis 7-methoxy-13,14 - seco-13,14-difluoromethylene-1-ethyl-2-methyl-1,2,3,4-tetrahydrophenanthrene-2-carboxylic acid in 20 ml. of dry tetrahydrofuran is cooled to —75° C. in a Dry Ice-acetone bath and treated with a previously cooled solution of 0.6 g. of lithium aluminum hydride in 20 ml. of dry tetrahydrofuran. The reaction mixture is then allowed to warm to room temperature and is then heated at reflux for about 15 minutes. The reaction mixture is then cooled and poured into ice water and extracted several times with ethyl acetate. The ethyl acetate extracts are combined, washed, dried and evaporated to yield cis 7-methoxy-13,14-seco-13,14-difluoromethylene-1-ethyl-2-methyl-2-hydroxymethyl - 1,2,3,4 - tetrahydrophenanthrene.

A mixture of 1 g. of the above compound, 4 ml. of pyridine and 4 ml. of acetic anhydride is allowed to stand at room temperature for 15 hours. The mixture is then poured into water and extracted several times with ethyl acetate. The ethyl acetate extracts are combined, washed, dried and evaporated to give cis 7-methoxy-13,14-seco-13,14-difluoromethylene - 1 - ethyl-2-methyl-2-acetoxymethyl-1,2,3,4-tetrahydrophenanthrene (A; $R^1$ is $CH_3$, $R^2$ is $CH_2OCOCH_3$, $R^3$ is $C_2H_5$, R is $OCH_3$, X is $CF_2$).

What is claimed is:

1. A compound selected from those of the formula

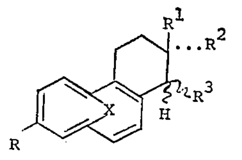

wherein

R is hydrogen, carboxylic acyloxy, containing from 1 to 12 carbon atoms lower alkoxy, cyclopentyloxy, cyclohexyloxy, tetrahydropyran-2′-yloxy or tetrahydrofuran-2′-yloxy;

$R^1$ is methyl or ethyl;

$R^2$ is —$COOR^5$ in which $R^5$ is hydrogen, lower alkyl, alkali metal or alkaline earth metal;

$R^3$ is methyl or ethyl; and

X is methylene, difluoromethylene, or dichloromethylene.

2. Compounds according to claim 1 wherein R is lower alkoxy and $R^2$ is the group —$COOR^5$ in which $R^5$ is hydrogen or lower alkyl.

3. Compounds according to claim 2 wherein R is methoxy.

4. Compounds according to claim 2 wherein R is methoxy, $R^1$ is methyl and $R^3$ is ethyl.

5. Compounds according to claim 2 wherein R is methoxy and $R^5$ is methyl.

6. Compounds according to claim 2 wherein R is methoxy and $R^5$ is hydrogen.

7. Compounds according to claim 1 wherein R is cyclopentyloxy and $R^2$ is the group —$COOR^5$ in which $R^5$ is hydrogen or lower alkyl.

8. Compounds according to claim 1 wherein R is carboxylic acyloxy and $R^2$ is the group —$COOR^5$ in which $R^5$ is hydrogen or lower alkyl.

9. Compounds according to claim 8 wherein R is acetoxy.

10. Compounds accordin gto claim 8 wherein R is acetoxy and $R^3$ is ethyl.

11. Compounds according to claim 1 wherein R is hydrogen and $R^2$ is the group —$COOR^5$ in which $R^5$ is hydrogen or lower alkyl.

12. Compounds according to claim 1 wherein X is methylene.

References Cited

UNITED STATES PATENTS 3,278,587 11/1966 Knox -------------- 260—487

OTHER REFERENCES

Kirmse, Carbene Chemistry, p. 175, 1964.

LEWIS GOTTS, Primary Examiner

R. GERSTL, Assistant Examiner

U.S. Cl. X.R.

260—333, 345.7, 345.8, 347.5, 348 A, 348 C, 468 B, 468.5, 514 B, 598, 599, 611 F, 617 F; 424—278, 299, 317

UNITED STATES PATENT OFFICE

CERTIFICATE OF CORRECTION

Patent No. 3,639,462 Dated February 1, 1972

Inventor(s) William McCrae, John H. Fried, and John A. Edwards

It is certified that error appears in the above-identified patent and that said Letters Patent are hereby corrected as shown below:

Column 3, line 68, "cyclophentyl," should be -- cyclopentyl, --.

Column 4, line 46, after "wherein $R^2$" is" and before "-COOH" delete -- is --.

Column 4, lines 68 and 69, "pyrimidine," should be -- pyridine, --.

Column 11, line 25, "cis 7-(tetrahydropyran-2'-yloxyl)-" should be -- cis 7-(tetrahydropyran-2'-yloxy)- --.

Column 11, line 48, "To a solution of g." should be -- To a solution of 1 g. --.

Column 12, lines 49 and 50 should be deleted.

Column 13, line 11, "cis 1-methoxy-13,14-seco-13," should be -- cis 7-methoxy-13,14-seco-13, --.

Signed and sealed this 19th day of December 1972.

(SEAL)
Attest:

EDWARD M.FLETCHER,JR.
Attesting Officer

ROBERT GOTTSCHALK
Commissioner of Patents